United States Patent [19]

Baum et al.

[11] Patent Number: 5,236,080
[45] Date of Patent: Aug. 17, 1993

[54] BUSHING LINER FOR A BUSHING OF AN ENDLESS CHAIN OF A TEXTILE MACHINE TRAVELING WEB TRANSPORT ASSEMBLY

[75] Inventors: Gottfried Baum, Erkelenz; Helge Freiberg, Monchen-Gladbach, both of Fed. Rep. of Germany

[73] Assignee: A. Monforts GmbH & Co., Monchen-Gladbach, Fed. Rep. of Germany

[21] Appl. No.: 893,318

[22] Filed: Jun. 3, 1992

[30] Foreign Application Priority Data

Jun. 6, 1991 [DE] Fed. Rep. of Germany ....... 4118493

[51] Int. Cl.[5] ............................................. B65G 45/02
[52] U.S. Cl. ................................... 198/845; 198/500; 384/273; 474/209
[58] Field of Search ................. 198/845, 838, 500; 384/273, 280, 281; 474/209

[56] References Cited

U.S. PATENT DOCUMENTS

| 1,552,054 | 9/1925 | Gleen | 384/273 |
| 3,878,735 | 4/1975 | Preuss | 198/500 |
| 4,729,754 | 3/1988 | Thuerman | 474/209 X |
| 5,072,824 | 12/1991 | Röntgen | 198/500 |

FOREIGN PATENT DOCUMENTS

| 2519324 | 7/1983 | France | 198/500 |
| 0390197 | 3/1933 | United Kingdom | 384/273 |

Primary Examiner—Robert P. Olszewski
Assistant Examiner—Cheryl Gastineau
Attorney, Agent, or Firm—Shefte, Pinckney & Sawyer

[57] ABSTRACT

A bushing liner is provided for a bushing of an endless chain of a textile machine traveling web transport assembly of the type which supports a web in tension during transport of the web through a textile handling process such as, for example, a web drying process. The endless chain includes a plurality of links, each respective adjacent pair of the links being interconnected to one another by a pin and each pin being rotatably supported by a bushing mounted to one of the links. The bushing liner of the present invention is disposed intermediate a bushing and its associated pin and includes first and second circumferential ends normally angularly spaced from one another by a slot. The slot extends from one axial end to the other of the bushing liner and permits angular movement of the first and second circumferential ends toward and away from one another to thereby permit the bushing liner to accommodate internal and external forces exerted thereon. Preferably, the slot is inclined with respect to the axis of the bushing liner.

16 Claims, 2 Drawing Sheets

BUSHING LINER FOR A BUSHING OF AN ENDLESS CHAIN OF A TEXTILE MACHINE TRAVELING WEB TRANSPORT ASSEMBLY

BACKGROUND OF THE INVENTION

The present invention relates to a bushing liner for rotatably mounting a pin in a bushing on an endless chain of a textile machine traveling web transport assembly.

It is known in textile machine traveling web transport assemblies to provide a pair of spaced endless chains, each supporting a plurality of web engaging members such as, for example, vertical pins, onto which one edge portion of a textile web is impaled for transport of the textile web through a tenter frame or other textile machine which handles the web. Each endless chain includes a plurality of links, each respective adjacent pair of links being interconnected to one another by a pin. Each pin is rotatably supported by a bushing mounted to one of the pair of links and one known arrangement for rotatably mounting a pin in a bushing includes an annular bushing liner between the pin and the bushing.

In a tentering frame chain disclosed in U.S. Pat. No. 4,926,529, there is disclosed a sliding bushing liner made of synthetic resin, and produced in a way that a plastic part of the material is first pressed into the supporting bushing liner, preferably made of steel, and a bore is then made to finish the sliding bushing liner.

By boring the sliding bushing liner, which is secured against twisting by pressing it into the supporting bush, the wall thickness of the sliding bushing liner can be brought to a minimum dimension necessary for the manufacture of a greaseless bearing so that, when the chain is under tension in operation, the length of the chain will not significantly change due to the fact that the sliding bushing accommodates the tension through corresponding increases and decreases in its thickness and, accordingly, the chain will show no alteration in length. The pressing in and boring of the sliding bushing liner, however, is a work-intensive step of process during the manufacture of the chain.

One suggested approach is to prefabricate the sliding bushing liner of synthetic resin and loosely insert it into the space between supporting bush and joint bolt. Thermal and/or mechanical strains, however, cause breaking of the sliding bushing, which is more intended for minimal friction than for mechanical strength. A sliding bushing made of synthetic resin loosely inserted into the space between supporting bush and the joint bolts is in addition intended to be firmly positioned as specified, which avoids the sliding bushing to partly or wholly slip out of the space between supporting bush and joint bolt and to the bottom, either during assembly or when in operation.

Therefore, the need exists for a bushing liner made of high-temperature resistant synthetic resin, that is loosely to be inserted between supporting bushing and joint bolts of the jointpart of a tentering frame chain, that which remains stable even in spite of strongly varying and extreme mechanical and thermal stresses as typical for stretching machines for web of cloth. Additionally, the need exists for a sliding bushing which can easily be inserted from top or from a side into the supporting bushing during assembly.

SUMMARY OF THE INVENTION

Briefly described, the present invention provides, in one aspect thereof, an endless chain for a traveling web transport assembly of a textile machine of the type for transporting a web of textile material in open width supported manner. The endless chain includes a plurality of links and a plurality of annular bushings, each bushing being mounted on a link. Also, the endless chain includes a plurality of pins, each pin being rotatably supported in a respective bushing and being connected to a link different than the link on which the associated bushing is mounted, whereby each adjacent pair of links is movably interconnected to one another by a respective pin connected to one of the pair of links and rotatably supported in a respective bushing mounted on the other of the pair of links. The endless chain additionally includes a plurality of annular bushing liners, each bushing liner being disposed radially intermediate a respective annular bushing and the associated pin rotatably supported therein and having a first circumferential end and a second circumferential end normally angularly spaced from the first circumferential end by a slot. The slot extends from one axial end of the bushing liner to its other axial end and permits angular movement of the first and second circumferential ends toward and away from one another to thereby permit the bushing liner to accommodate internal and external forces exerted thereon.

According to one feature of the one aspect of the present invention, at least a portion of each slot is inclined relative to the bushing liner axis. Preferably, the angle of inclination of the inclined portion of each slot is in the range of approximately 10 degrees to 30 degrees.

According to another feature of the one aspect of the present invention, each annular bushing liner and its slot are formed by molding. According to an additional feature, each slot is cut into the annular bushing liner.

According to a further additional feature of the one aspect of the present invention, the endless chain also includes a radial projection formed on a selected one of each annular bushing and its associated bushing liner and a projection receiving recess formed on the other of each annular bushing and its associated bushing liner for receiving the projection therein to thereby limit the relative angular movement between each annular bushing and its associated bushing liner. Preferably, each projection is formed on a bushing liner and each projection receiving recess is formed on an annular bushing. Also, the projection of each annular bushing liner is preferably integrally formed on the bushing liner.

According to another aspect of the present invention, there is provided a bushing liner for an endless chain of a traveling web transport assembly of a textile machine, the traveling web transport assembly being of the type for transporting a web of textile material in supported manner during drying thereof and the endless chain including a plurality of links, a plurality of annular bushings, each bushing being mounted on a link, and a plurality of pins. Each pin is rotatably supported in a respective bushing and being connected to a link different than the link on which the associated bushing is mounted, whereby each adjacent pair of links is movably interconnected to one another by a respective pin rotatably supported in a respective bushing mounted on the other of the pair of links. The bushing liner includes a first circumferential end and a second circumferential end normally angularly spaced from the first circumferential end by a slot and the bushing liner being disposed radially intermediate a respective annular bushing and the associated pin rotatably supported therein and the slot extending from one axial end of the bushing liner to its other axial end and permitting angular movement of the first and second circumferential ends toward and away from one another to thereby permit the bushing liner to accommodate internal and external forces exerted thereon.

DETAILED DESCRIPTION OF THE PREFERRED EMBODIMENT

Figure 1:
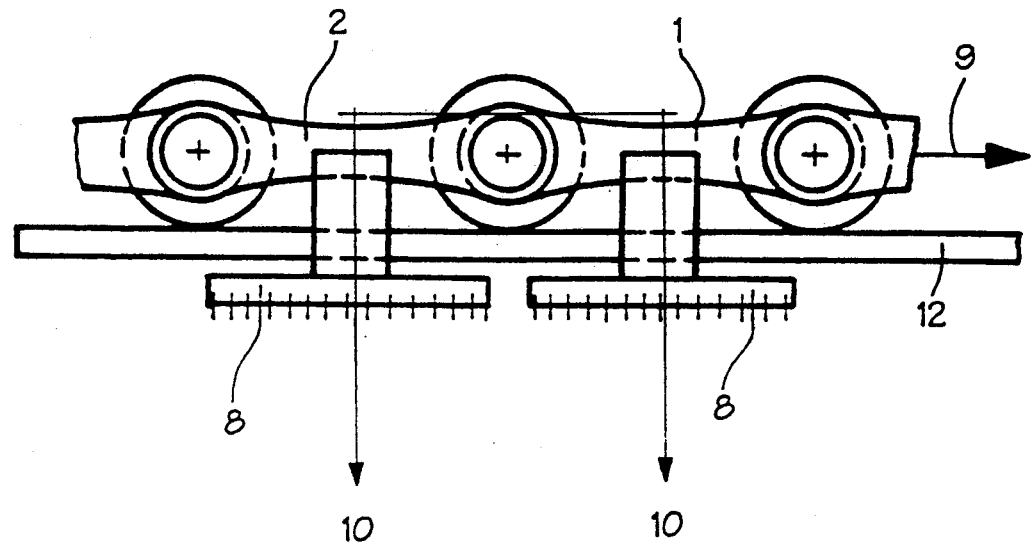
FIG. 1 is a top plan view of a portion of the preferred embodiment of the textile machine endless chain of the present invention and a portion of the guide rail of a transport assembly.
Figure 2:
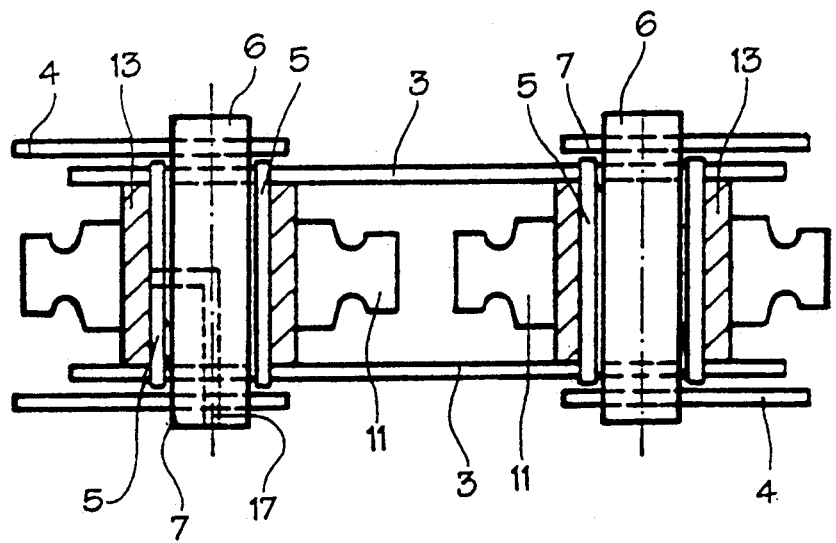
FIG. 2 is an enlarged front elevational view, in partial vertical section, of a portion of the endless chain shown in FIG. 1.
Figure 3:
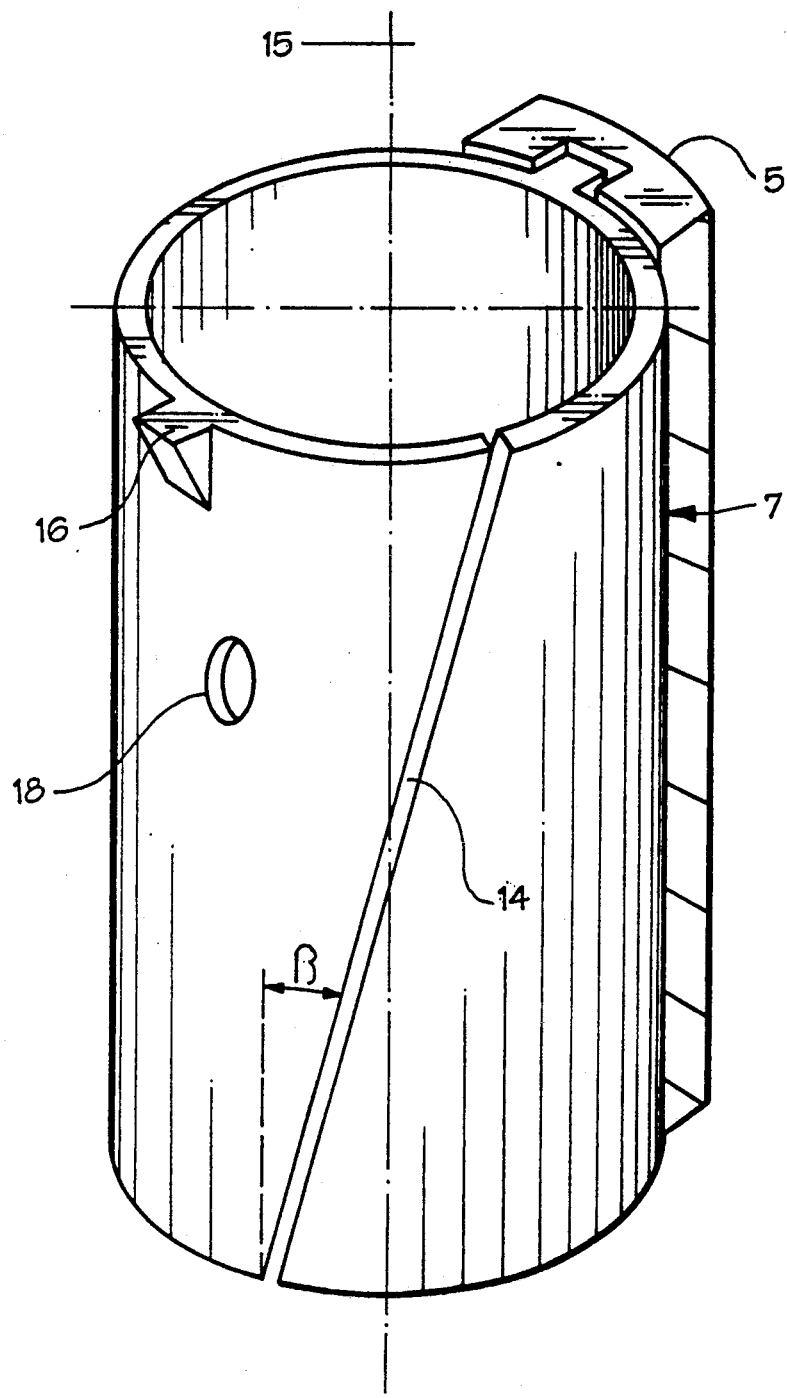
FIG. 3 is an enlarged perspective view of an annular bushing liner of the endless chain shown in FIG. 1.

As seen in FIGS. 1-3, the preferred embodiment of the endless chain of the present invention, along with other components (not shown), is part of a traveling web transport assembly of a textile machine for transporting a web of textile material in a supported disposition during treatment of the web such as, for example, during drying of the web in a tenter frame. The textile web transport assembly preferably includes a pair of the endless chains arranged for travel in parallel, spaced relation to one another with each endless chain supporting a respective lateral edge of the textile web. Each endless chain includes a plurality of hub links 1 and a plurality of pin links 2, as seen in FIG. 1. As seen in FIG. 2, each hub link 1 is comprised of a pair of hub link components 3 in parallel, spaced relation to one another and each pin link 2 comprises a pair of pin link components 4 in parallel, spaced relation to one another. The pairs of the hub link components 3 are interconnected to the pairs of the pin link components 4 in alternating manner such that each pair of the link components 3,4 interconnects a respective pair of the other type of link components.

As seen in FIG. 2, a pair of pins 6 are rotatably mounted to each respective pair of the hub link components 3 and the respective pair of the pin links 2 interconnected to one another by one of the hub links 1 are interconnected to the hub link 1 by the respective pair of the pins 6. Each respective pair of the hub link components 3 includes a pair of throughbores, each throughbore for receiving therein an annular bushing 5 in a fixed mounted disposition. Each annular bushing 5 is preferably formed of steel and has an inner diameter selected in correspondence with the outer diameter of a pin 6 for rotatably mounting the pin 6 in coaxial manner in the annular bushing. As seen in FIG. 2, a bushing liner 7, preferably comprising a low friction wear resistant plastic material, is disposed radially intermediate each steel bushing and its associated pin 6 for smooth relative rotation of the pin and the bushing.

As seen in FIG. 1, the endless chain also includes a plurality of web engaging members 8, each comprising a support frame fixedly mounted to a respective one of the hub links 1 or the pin links 2 and having a plurality of vertically extending needles for receiving the edge of a web to be transported in impaled manner thereon. Due to forces such as, for example, an inherent shrinking characteristic of the web being transported, each endless chain is subjected to lateral forces, shown by the arrows 10 in FIG. 1, transverse to the direction of movement of the endless chain, shown by the arrow 9 in FIG. 1. To oppose the lateral forces exerted on each endless chain, the textile web transport assembly includes a guide rail 12 extending parallel to the direction of movement of each endless chain for cooperating with a plurality of annular guide rollers 11, seen in FIG. 2, mounted on the endless chain. The outer circumferential surface of each guide roller 11 is at a radius greater than the lateral extent of the hub links 1 and the pin links 2 such that the guide rollers 11 extend laterally beyond the links for rolling travel along the guide rail 12. Each guide roller 11 is rotatably mounted to a respective one of the bushings 5 by a roller liner 13 which supports the guide roller coaxial to the bushing.

Each roller liner 13, as seen in FIG. 2, is preferably formed of a high temperature resistant, low friction, wear resistant material such as, for example, a polyimide derivative.

As seen in FIG. 3, each bushing liner 7 is annular in shape and has an axis 15. Each annular bushing liner 7 includes a first circumferential end and a second circumferential end normally angularly spaced from the first circumferential end by a slot 14 extending from one axial end of the bushing liner to its other axial end. The slot 14 is preferably of a uniform width in approximately the range of 0.1 to 1.0 millimeters in those situations in which the annular bushing liner 7 has an outside diameter of approximately 15 millimeters and a wall thickness between its outside and inside diameters of approximately one millimeter. The slot 14 of each annular bushing liner 7 permits angular movement of the first and second circumferential ends toward and away from one another to thereby permit the bushing liner to accommodate internal and external forces exerted thereon.

The slot 14 of each annular bushing liner 7 is preferably inclined relative to the bushing liner axis 15 at an angle in the range of approximately 10 degrees to 30 degrees. An annular bushing liner with an inclined slot is preferred as compared to an annular bushing liner with a non-inclined slot, as the bushing liner with an inclined slot can accommodate radial forces from any angle without any significant reduction in the capacity of the bushing liner to accommodate the forces whereas, in contrast, a bushing with a non-inclined slot may suffer significantly reduced bearing capacity at the location of the slot with respect to a radial force at the location of the slot.

The slot 14 in each annular bushing liner 7 can be formed by initially forming the annular bushing liner as a complete cylinder and thereafter cutting the slot 14 into the annular bushing liner 7. Alternatively, the slot 14 can be formed during the initial formation of the annular bushing liner 7 such as, for example, by molding.

Each annular bushing liner 7 includes a pair of radially outwardly projecting lugs 16 disposed on the same diameter relative to the bushing liner axis 15. Each bushing 5 is provided with a pair of diametrically opposed recesses compatibly configured with respect to the lugs 16 of its annular bushing liner 7 to accommodate the lugs therein. The lugs 16 of each annular bushing liner 7 and the corresponding recesses in the respective associated bushing 5 facilitate the assembly of the annular bushing liner into its bushing and, additionally, the lugs 16 and their corresponding recesses in the bushing 5 prevent angular or twisting movement of the annular bushing liner 7 relative to the associated bushing 5. Each lug 16 is preferably integrally formed with the annular bushing liner 7 on which it is disposed.

Each annular bushing liner 7 is preferably formed of a high temperature resistent, low friction, wear resistant material such as, for example, a polyimide derivative. Additionally, to facilitate the introduction of lubricant to the roller liner 13, a lubrication outlet hole 18 is formed in each annular bushing liner 7 to provide an aperture through which a conduit 17 as illustrated in FIG. 2 extends radially outwardly from the interior of the associated pin 6 through the opening 18 of the annular bushing liner 7 into a corresponding aligned hole in the associated bushing 5 to thereby provide a conduit for lubricant.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. In a traveling web transport assembly of a textile machine of the type for transporting a web of textile material in an open width supported manner, an endless chain comprising:

a plurality of links;

a plurality of annular bushings, each bushing being mounted on a link;

a plurality of pins, each pin being rotatably supported in a respective bushing and being connected to a link different than the link on which the associated bushing is mounted, whereby each adjacent pair of links is movably interconnected to one another by a respective pin connected to one of the pair of links and rotatably supported in a respective bushing mounted on the other of the pair of links; and a plurality of annular bushing liners, each bushing liner being disposed radially intermediate a respective annular bushing and the associated pin rotatably supported therein and having a first circumferential end and a second circumferential end normally angularly spaced from the first circumferential end by a slot, the slot extending from one axial end of the bushing liner to its other axial end and the slot permitting angular movement of the first and second circumferential ends toward and away from one another to thereby permit the bushing liner to accommodate internal and external forces exerted thereon.

2. In a traveling web transport assembly, an endless chain according to claim 1 wherein at least a portion of each slot is inclined relative to the bushing liner axis.

3. In a traveling web transport assembly, an endless chain according to claim 2 wherein the angle of inclination of the inclined portion of each slot is in the range of approximately 10 degrees to 30 degrees.

4. In a traveling web transport assembly, an endless chain according to claim 1 wherein each annular bushing liner is a molded part with the slot formed by molding of the part.

5. In a traveling web transport assembly, an endless chain according to claim 1 wherein each slot is formed by cutting into the annular bushing liner.

6. In a traveling web transport assembly, an endless chain according to claim 1 and further comprising a radial projection formed on a selected one of each annular bushing and its associated bushing liner and a projection receiving recess formed on the other of each annular bushing and its associated bushing liner for receiving the projection therein to thereby limit the relative angular movement between each annular bushing and its associated bushing liner.

7. In a traveling web transport assembly, an endless chain according to claim 6 wherein each projection is formed on a bushing liner and each projection receiving recess is formed on an annular bushing.

8. In a traveling web transport assembly, an endless chain according to claim 7 wherein the projection of each annular bushing liner is integrally formed on the bushing liner.

9. A bushing liner for an endless chain of a traveling web transport assembly of a textile machine, the traveling web transport assembly being of the type for transporting a web of textile material in supported manner during drying thereof and the endless chain including a plurality of links, a plurality of annular bushings, each bushing being mounted on a link, and a plurality of pins, each pin being rotatably supported in a respective bushing and being connected to a link different than the link on which the associated bushing is mounted, whereby each adjacent pair of links is movably interconnected to one another by a respective pin rotatably supported in a respective bushing mounted on the other of the pair of links, the bushing liner comprising a first circumferential end and a second circumferential end normally angularly spaced from the first circumferential end by a slot and the bushing liner being disposed radially intermediate a respective annular bushing and the associated pin rotatably supported therein and the slot extending from one axial end of the bushing liner to its other axial end and permitting angular movement of the first and second circumferential ends toward and away from one another to thereby permit the bushing liner to accommodate internal and external forces exerted thereon.

10. A bushing liner according to claim 9 wherein at least a portion of the slot is inclined relative to the bushing liner axis.

11. A bushing liner according to claim 10 wherein the angle of inclination of the inclined portion of the slot is in the range of approximately 10 degrees to 30 degrees.

12. A bushing liner according to claim 9 wherein the bushing liner and its slot are formed by molding.

13. A bushing liner according to claim 9 wherein the slot is cut into the bushing liner.

14. A bushing liner according to claim 9 and further comprising a radial projection formed on a selected one of the annular bushing and the bushing liner and a projection receiving recess formed on the other of the annular bushing and the bushing liner for receiving the projection therein to thereby limit the relative angular movement between the annular bushing and the bushing liner.

15. A bushing liner according to claim 14 wherein the projection is formed on the bushing liner and the projection receiving recess is formed on an annular bushing.

16. A bushing liner according to claim 15 wherein the projection is integrally formed on the bushing liner.

* * * * *